US012812278B2

(12) United States Patent
Burnham et al.

(10) Patent No.: US 12,812,278 B2
(45) Date of Patent: *Nov. 24, 2026

(54) MOTORCYCLE SADDLEBAG CUT IN KIT

(71) Applicant: Rockford Corporation, Tempe, AZ (US)

(72) Inventors: Christian Burnham, Peoria, AZ (US); Jeremy Clemens, Gilbert, AZ (US); Jason Thomas, Mesa, AZ (US); Cody Rahders, Gilbert, AZ (US); Ersen Boran, Tempe, AZ (US); Rick Jones, Tempe, AZ (US)

(73) Assignee: Rockford Corporation, Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/274,425

(22) Filed: Jul. 18, 2025

(65) Prior Publication Data

US 2026/0025608 A1 Jan. 22, 2026

Related U.S. Application Data

(60) Provisional application No. 63/673,648, filed on Jul. 19, 2024.

(51) Int. Cl.

| | |
|---|---|
| ***H04R 1/02*** | (2006.01) |
| ***B62J 9/00*** | (2020.01) |
| ***B62J 45/10*** | (2020.01) |

(52) U.S. Cl.

CPC .............. *H04R 1/025* (2013.01); *B62J 45/10* (2020.02); *H04R 1/023* (2013.01); *B62J 9/00* (2013.01); *H04R 2499/13* (2013.01)

(58) Field of Classification Search

CPC ........ H04R 1/021; H04R 1/023; H04R 1/025; H04R 2499/13; B62J 45/10; B62J 9/00

See application file for complete search history.

(56) References Cited

U.S. PATENT DOCUMENTS

| | | | | |
|---|---|---|---|---|
| 10,112,671 B1 * | 10/2018 | Yaffe | H04R 1/025 | |
| 2019/0127008 A1 * | 5/2019 | Yaffe | H04R 1/025 | |
| 2023/0041938 A1 * | 2/2023 | Brashear | B62J 9/00 | |
| 2023/0090676 A1 * | 3/2023 | Jones, Jr. | H04R 1/021 | 381/302 |

* cited by examiner

*Primary Examiner* — David L Ton

(74) *Attorney, Agent, or Firm* — Snell & Wilmer L.L.P.

(57) ABSTRACT

A method of installing a speaker system in an saddlebag of a motorcycle comprising: coupling a cutout template to a top surface of a lid of the saddlebag, perforating the lid according to the cutout template to create an aperture for the speaker system, wherein the aperture comprises a perimeter, passing a bucket through the aperture, wherein the bucket is configured to contact the top surface of the lid, coupling a backer to the bucket, wherein the bucket and the backer are configured to nest together, and wherein the backer is configured to contact a bottom surface of the lid, and removably coupling a grille to the speaker system, wherein the grille is configured to cover the speaker system and is positioned on the top surface of the lid.

20 Claims, 8 Drawing Sheets

MOTORCYCLE SADDLEBAG CUT IN KIT

CROSS-REFERENCE TO RELATED APPLICATIONS

This application claims priority to and the benefit of U.S. Provisional Patent Application Ser. No. 63/673,648 filed Jul. 19, 2024, entitled "Motorcycle Saddlebag Cut In Kit," the disclosure of which is incorporated herein by reference in its entirety for all purposes.

FIELD OF INVENTION

The present disclosure relates generally to improvements in speaker configurations, and, in particular, to the modification of original equipment manufacturer (OEM) vehicle parts to incorporate aftermarket audio devices.

BACKGROUND

In the field of motorcycle speaker system design, it has been the practice to place speakers in a variety of locations on a motorcycle. One of the most popular locations is within a motorcycle saddlebag, and specifically, on the lid of a motorcycle saddlebag. Additionally, for motorcycles manufactured without a speaker already installed, aftermarket installation kits are offered to integrate a speaker into the motorcycle, generally also placed within the lid of a motorcycle saddlebag. These kits are designed to mount a speaker to the bottom side of the saddlebag lid. However, while generally effective, this method of installment is prone to user error. One feature particularly susceptible to imprecise installation is the watertight seal connecting the speaker to the lid, rendering the speaker and internal saddlebag compartment at risk of water damage. Further, current kits are bulky and take up significant space within the saddlebags. Consequently, an improvement is desired to provide easier installation for users and minimize the risk of external elements, such as dirt or water, from entering the saddlebag while maximizing the amount of free space within the saddlebag.

SUMMARY

In an example embodiment, a method of installing a speaker system in a motorcycle is provided, the method comprising: coupling a cutout template to a top surface of a lid of the saddlebag, perforating the lid according to the cutout template to create an aperture for the speaker system, wherein the aperture comprises a perimeter, passing a bucket through the aperture, wherein the bucket is configured to contact the top surface of the lid, coupling a backer to the bucket, wherein the bucket and the backer are configured to nest together, and wherein the backer is configured to contact a bottom surface of the lid, and removably coupling a grille to the speaker system, wherein the grille is configured to cover the speaker system and is positioned on the top surface of the lid.

In various embodiments, the backer comprises a plurality of contact features positioned along a perimeter of a top surface of the backer, each contact feature in the plurality of contact features configured to contact the bottom surface of the lid. In various embodiments, the plurality of contact features comprises at least three contact points. In various embodiments, the backer comprises a plurality of backer pieces, each backer piece in the plurality of backer pieces configured to contact the bottom surface of the lid.

In various embodiments, the method further comprises placing a gasket around the perimeter of the aperture, wherein the gasket is configured to seal the saddlebag and prevent external material from entering the saddlebag through the aperture. In various embodiments, the bucket contacts the top surface of the lid via a gasket, and wherein the gasket is configured to seal the saddlebag and prevent external material from entering the saddlebag through the aperture.

In various embodiments, the bucket further comprises a flange. In various embodiments, the flange comprises a first portion that is substantially L shaped configured to align with a horizontal wall of the lid and a second portion that is substantially E shaped configured to align with a vertical wall of the lid. In various embodiments, the flange comprises a first portion that is substantially L shaped configured to align with a horizontal wall of the lid and a second portion that is substantially C shaped configured to align with a vertical wall of the lid.

In various embodiments, perforating the lid comprises cutting into the lid with a cutting instrument. In various embodiments, the cutout template comprises a guide rail configured to restrict angular movement of the cutting instrument during the perforating.

In another embodiment a speaker system is disclosed, comprising: a bucket configured to pass through an aperture in a lid of a motorcycle saddlebag and contact a top surface of the lid, wherein the aperture comprises a perimeter, a backer configured to couple to the bucket and contact a bottom surface of the lid, wherein the bucket and the backer are configured to nest together, a speaker configured to fit within the bucket and couple to the speaker system, and a grille configured to cover the speaker system and removably couple to the speaker system, wherein the grille is positioned on the top surface of the lid. In various embodiments, the grille is removably coupled to the speaker system with a plurality of coupling devices.

In various embodiments, the speaker system further comprises a gasket configured to be positioned around the perimeter of the aperture and create a seal to prevent external material from entering the motorcycle saddlebag through the aperture. In various embodiments, the gasket is coupled to the bucket.

BRIEF DESCRIPTION OF THE DRAWING FIGURES

Additional aspects of the present disclosure will become evident upon reviewing the non-limiting embodiments described in the specification and the claims taken in conjunction with the accompanying figures, wherein like numerals designate like elements, and:

DETAILED DESCRIPTION

Figure 1:
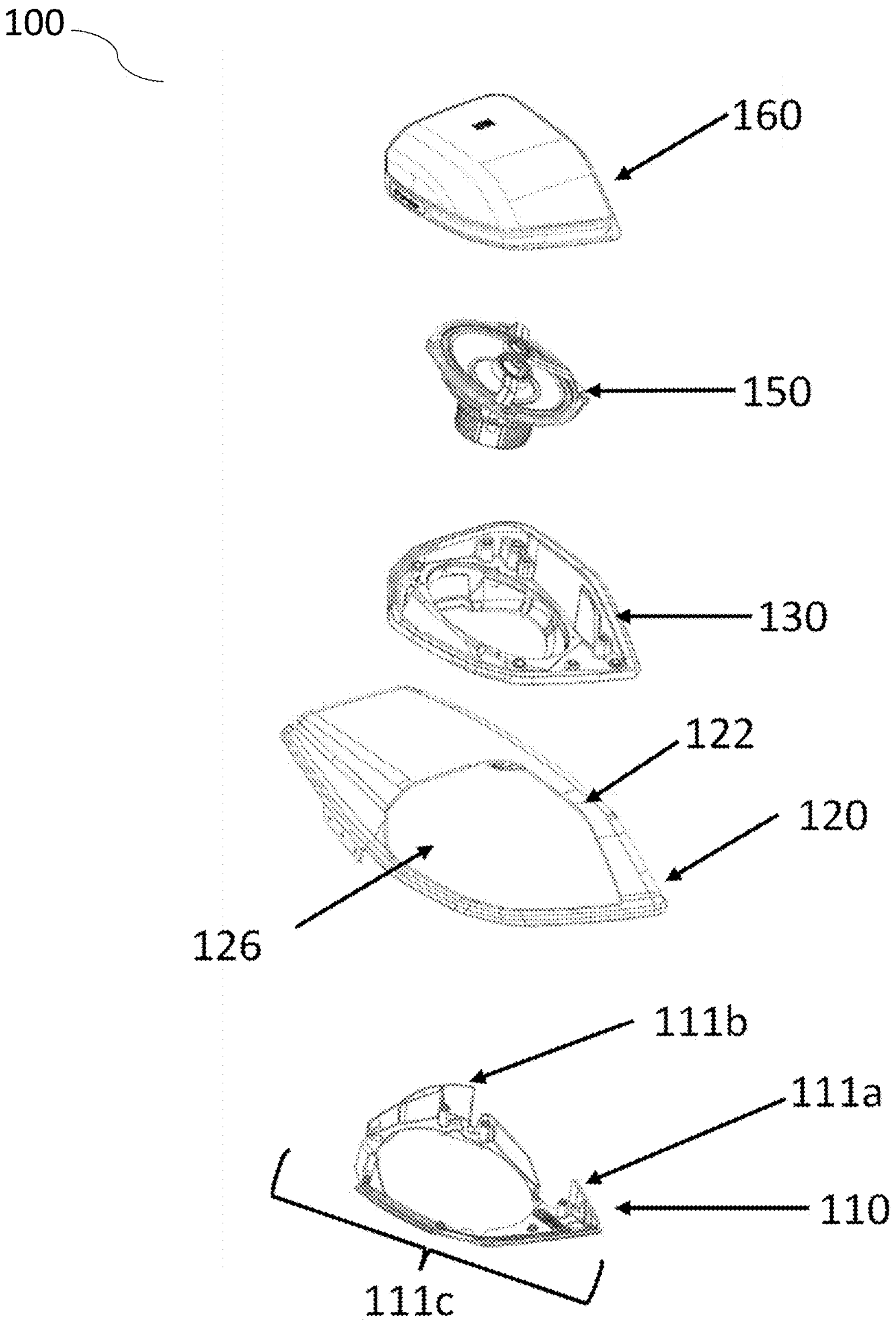
FIG. 1 is an exploded perspective top view of a speaker system according to various embodiments of this disclosure.

Reference will now be made to the exemplary embodiments illustrated in the drawings, and specific language will be used herein to describe the same. It will nevertheless be understood that no limitation of the scope of the disclosure is thereby intended. Alterations and further modifications of the inventive features illustrated herein, and additional applications of the principles of the disclosure as illustrated herein, which would occur to one skilled in the relevant art and having possession of this disclosure, are to be considered within the scope of the disclosure.

In accordance with an example embodiment, systems devices methods are provided for improved methods of integrating a speaker system into a motorcycle.

Figure 2:
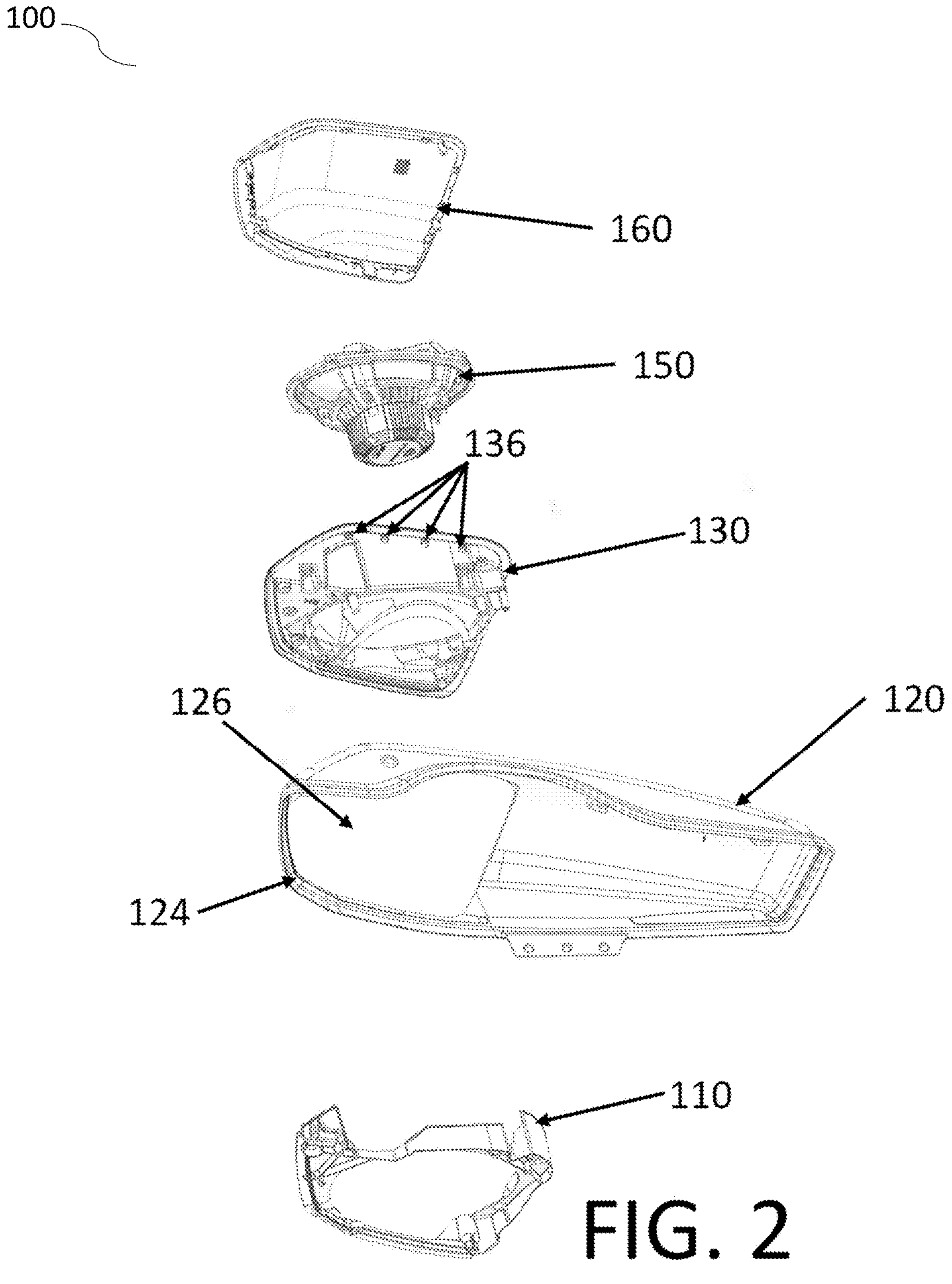
FIG. 2 is an exploded perspective bottom view of a speaker system according to various embodiments of this disclosure.
Figure 3:
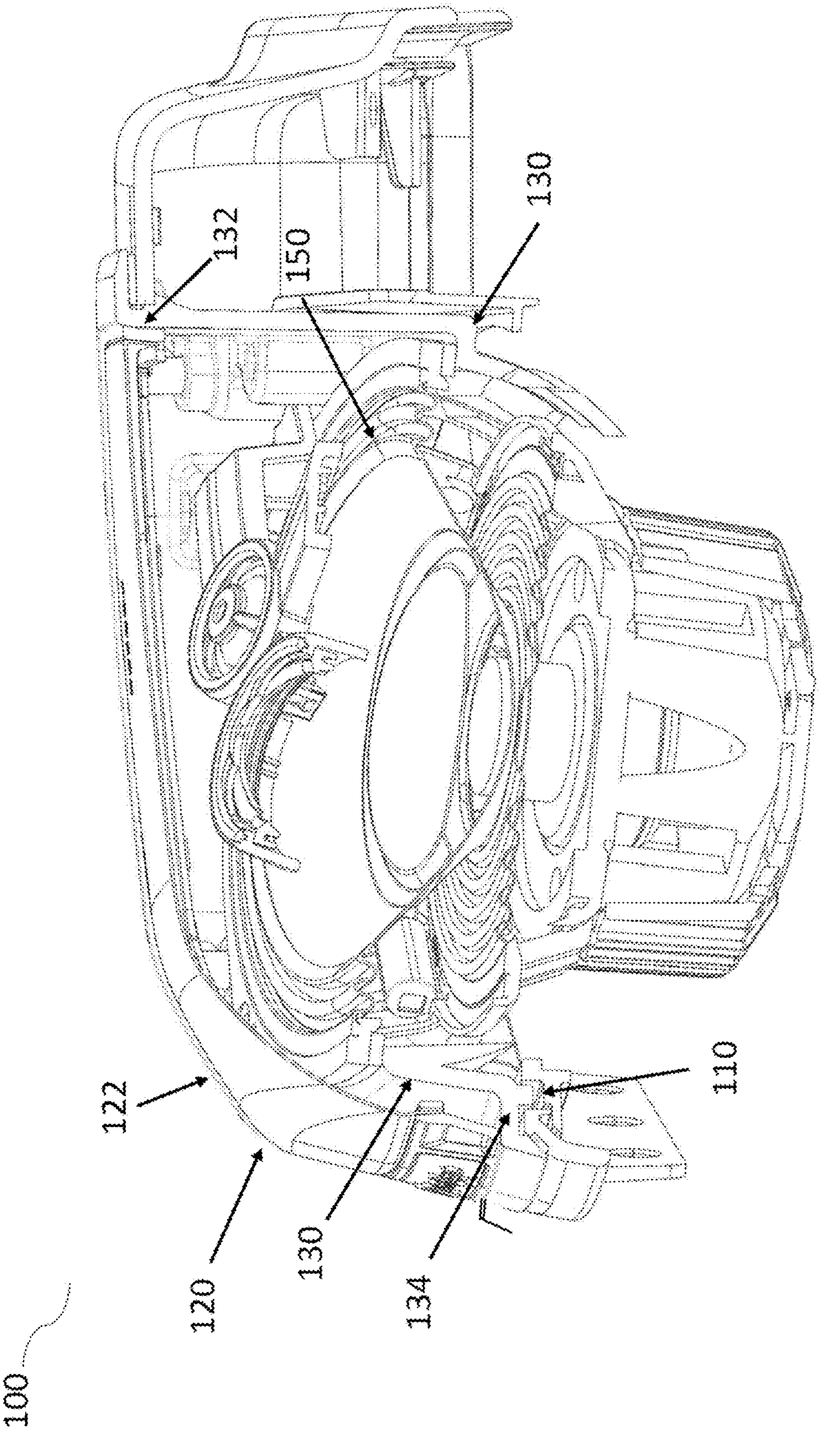
FIG. 3 is a cross section of a speaker system as seen from the side according to various embodiments of this disclosure.

With reference now to FIGS. 1-3, a speaker system design for installation into a motorcycle is disclosed. In an example embodiment, a speaker system 100 is configured for retrofit installation in a lid 120 of a motorcycle saddlebag. As illustrated in FIG. 1, the lid 120 is retrofit by cutting an aperture 126, in lid 120. Speaker system 100 may comprise backer 110 and bucket 130. Backer 110 and bucket 130 may be configured to removably couple to each other. In an example embodiment, backer 110 and bucket 130 may couple to each other by interlocking with each other, such that backer 110 comprises a plurality of protruding coupling features and a plurality of receiving coupling features corresponding to a plurality of protruding coupling features and plurality of receiving coupling features on bucket 130 (i.e. the protruding coupling features of backer 110 insert into the plurality of receiving coupling features of bucket 130, and/or the receiving coupling features of backer 110 receive the plurality of protruding coupling features of bucket 130). In such embodiments, the plurality of receiving coupling features and the plurality of protruding coupling features of backer 110 are located on the inside surface of backer 110, while the plurality of receiving coupling features and the plurality of protruding coupling features of bucket 130 are located on the outside surface of bucket 130. In another example embodiment, backer 110 and bucket 130 may couple to each other by screws sunk through one into the other. In other embodiments, any combination of coupling features may be used.

In an example embodiment, backer 110 and bucket 130 are configured to 'sandwich' saddlebag lid 120. Stated another way, in an example embodiment, backer 110 is placed on the bottom surface 124 of lid 120 and bucket 130 is placed on the top surface 122 of lid 120. In an example embodiment, bucket 130 nests inside of backer 110, the outside surface of bucket 130 contacting the inside surface of backer 110. However, the disclosure is not limited to this embodiment, and alternate designs, such as, for example, backer 110 nesting within bucket 130, such that the inside surface of bucket 130 contacts the outside surface of backer 110, are within the scope of this disclosure. In various embodiments, the outside nesting element, whether that be the backer 110 or bucket 130, may exert a compressive 'clamping' force against the inside nesting element.

In various embodiments, bucket 130 may comprise at least one fastener 136 positioned on the outside surface of bucket 130 and configured to fasten bucket 130 to saddlebag lid 120 on an edge of aperture 126. The at least one fastener 136 may be beneficial in embodiments wherein components of the motorcycle saddlebag (not shown) protrude into the saddlebag, preventing a portion of backer 110 from contacting a corresponding portion of bucket 130. Without the at least one fastener 136, the clamping force against the inside nesting element would be limited in this area, potentially rendering the bucket 130 and backer 110 loose around the saddlebag lid 120 in this area.

In various embodiments, the at least one fastener 136 may be any device suitable for fastening the bucket 130 to the saddlebag lid 120 via the edge of the aperture 126, such as, for example, a clip, latch, or clamp. In various embodiments, the at least one fastener 136 comprises a ramped feature configured to snap under the edge of the aperture 126 and provide a force between the bucket 130 and saddlebag lid 120. In such embodiments, the at least one fastener 136 compensates for the clamping force missing from the portion of backer 110 that is unable to contact a corresponding portion of bucket 130 due to the protruding OEM components of the motorcycle saddlebag. In various embodiments, the protruding OEM components may be a latching mechanism.

Figure 4:
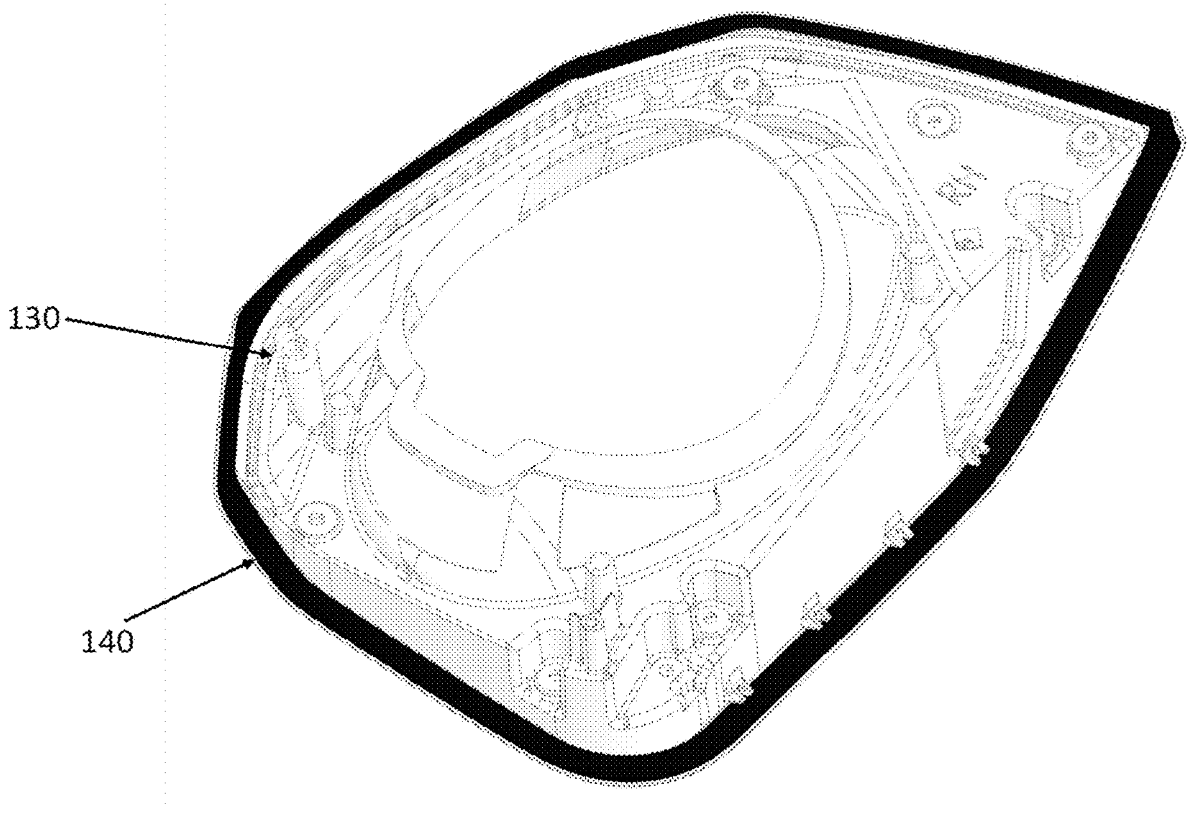
FIG. 4 is a bottom view of the bucket component of the speaker system according to various embodiments of this disclosure.

Speaker system 100 may further comprise a gasket 140. In various embodiments, gasket 140 is positioned around the perimeter of aperture 126. In various embodiments, gasket 140 is positioned on the outer surface of bucket 130, as shown in FIG. 4, running along the interface between bucket 130 and lid 120. In such embodiments, gasket 140 is configured to press against the top surface 122 of lid 120 when bucket 130 is placed in the newly cut aperture 126 in lid 120. In various embodiments, gasket 140 may be coupled to the outer surface of bucket 130. In other embodiments, gasket 140 may be positioned on the outer surface of backer 110 or on lid 120.

Gasket 140 is configured to act as a seal between the saddlebag lid 120 (not shown in FIG. 4) and speaker system 100, preventing external elements, such as dirt or water, from entering the saddlebag. The system 100 may be an improvement over currently available speaker installation kits, as by pressing gasket 140 onto the top surface 122 of lid 120, a more effective watertight seal is formed than if gasket 140 were pressed against the bottom surface 124 of lid 120, which is the configuration of said kits. Due to the compressive force produced by the nesting of bucket 130 in backer 110, backer 110 acts as a wedge to hold bucket 130 in place and restrain gasket 140 taut against lid 120. Stated another way, the screws or other such attachment mechanisms are configured to clamp a portion of the lid 120 (i.e., the perimeter of the lid around aperture 126 in the lid) between the bucket 130 and the backer 110.

In one example embodiment, backer 110 as shown comprises one cohesive piece designed to correspond with the shape of bucket 130. However, the disclosure is not limited to this embodiment. For example, backer 110 may be a plurality of pieces configured to couple together and interlock with bucket 130, resulting in a more precise alignment with bucket 130 and therefore a stronger seal between gasket 140 and lid 120.

In one example embodiment, backer 110 comprises a plurality of contact features positioned along a perimeter of a top surface of the backer 110. In an example embodiment, and as illustrated in FIG. 1, the backer 110 comprises three contact features (111$a$, 111$b$, and 111$c$) positioned along a perimeter of a top surface of the backer 110. In an example embodiment, the contact features are configured to contact the bottom surface of the lid of the saddlebag. The contact features are configured to provide a stable, secure mounting of the backer 110/bucket 130 assembly to the lid 120. This secure mounting reduces vibration of speaker 150 with respect to lid 120, improving sound quality and long-term performance. Thus, in various embodiments, the contact features may comprise at least three contact points, as shown. In one example embodiment (not shown), the backer 110 may contact the lid about its entire perimeter or circumference. However, by leaving gaps about the perimeter, a lighter backer 110 can be used. Further, said gaps are configured to accommodate a larger bucket in lid 120, allowing for the installation of a larger speaker. In other embodiments, any suitable number of contact features may be used.

In various embodiments, bucket 130 further comprises a flange which is uniquely designed to follow the shape of lid 120, having a substantially L-shaped portion 132 configured to press against the horizontal walls of lid 120, and a substantially C or E shaped portion 134 configured to act as a channel, surrounding and pressing against the vertical walls of lid 120. The unique shape of the flange ensures that speaker system 100 is watertight across all locations it contacts top surface 122 of lid 120. Similarly, gasket 140 must follow the shape of lid 120, therefore, gasket 140 follows a nonplanar path around the edge of aperture 126, transitioning from a substantially horizontal orientation to a substantially vertical orientation and back to a substantially horizontal orientation as required by the orientation of aperture 126.

In various embodiments, speaker system 100 further comprises speaker 150, configured to rest inside of bucket 130. In various embodiments, speaker 150 may be any audio device suitable for use in a motorcycle, such as, for example, audio devices of the size 6.5", 8", 5×7", or 6×9" with power outputs of the range from about 50 watts to about 200 watts RMS in power output. In various embodiments, speaker 150 may be a coaxial speaker or a component speaker. In an example embodiment, the bucket 130 comprises attachment points for attaching the speaker to the bucket. In one example embodiment, the speaker is secured to the bucket using screws, clips, or any other suitable device for attaching the speaker to the bucket. However, in other embodiments, speaker 150 may couple to any location in the speaker system sufficient to secure speaker 150 in its position within bucket 130.

Grille 160 is positioned over the top of speaker 150. In an example embodiment, grille 160 is configured to cover the speaker 150 and protect it from the elements. Grille 160 may comprise clips (not shown) configured to removably couple to the speaker system. Grille 160 may couple to the speaker system at backer 110, lid 120, bucket 130, or any other location on the speaker system sufficient to allow the grille to cover the speaker. By using clips, gasket 140 is not touched, ensuring that the watertight seal is not breached. However, any coupling device, such as for example, screws or adhesive, may be used to couple grille 160 to the speaker system.

In an alternative embodiment (not shown), backer 110 and bucket 130 may couple together before being installed on lid 120, with the combined backer 110/bucket 130 assembly being placed on the bottom surface 124 of lid 120. In such embodiments, bolts are inserted from underneath to couple the backer 110/bucket 130 assembly to lid 120. In such embodiments, grille 160 would comprise a larger perimeter respective to the grille described above. Grille 160 would further comprise gasket 140, instead of gasket 140 being placed on bucket 130, so as to keep the seal on the top surface of lid 120.

Figure 5:
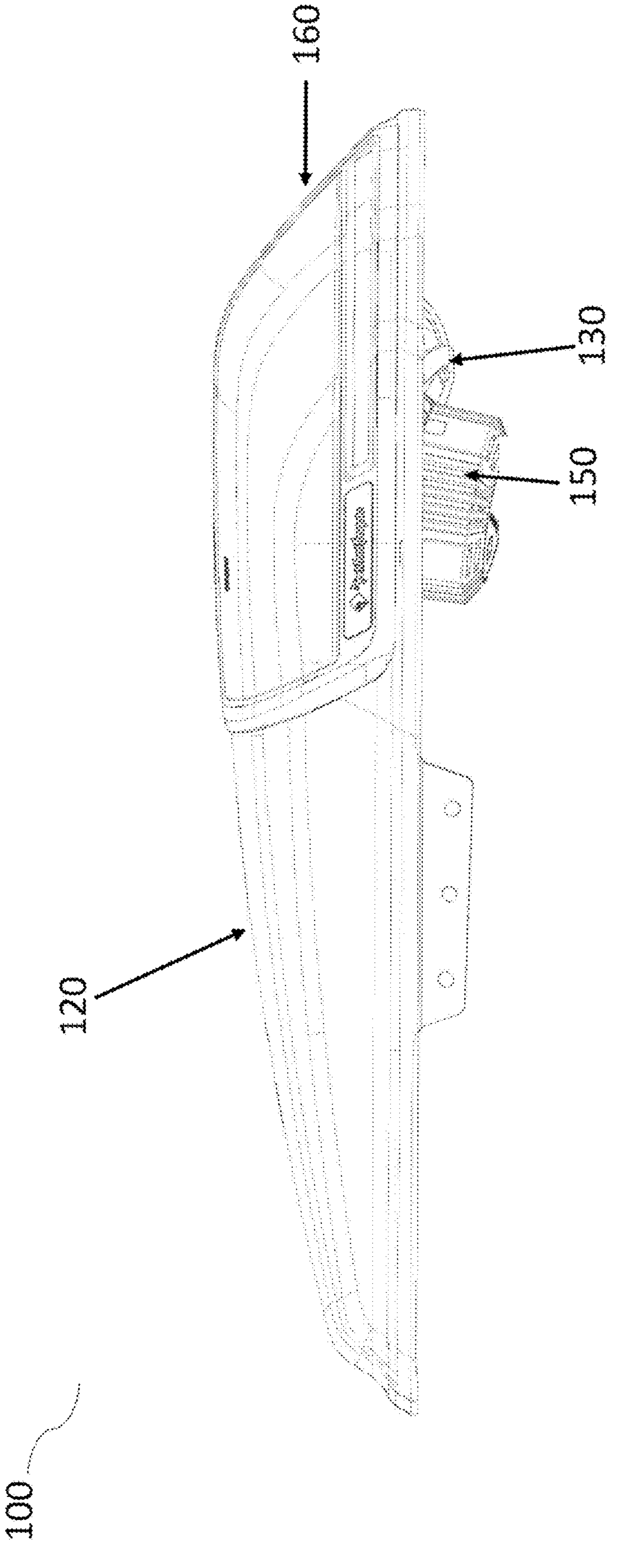
FIG. 5 is a side view of a speaker system as assembled according to various embodiments of this disclosure.

As can be seen in FIG. 5, when the speaker system 100 is assembled within the saddlebag lid, the speaker system components are all contained within the saddlebag, leaving only grille 160 visible from the outside.

Figure 6:
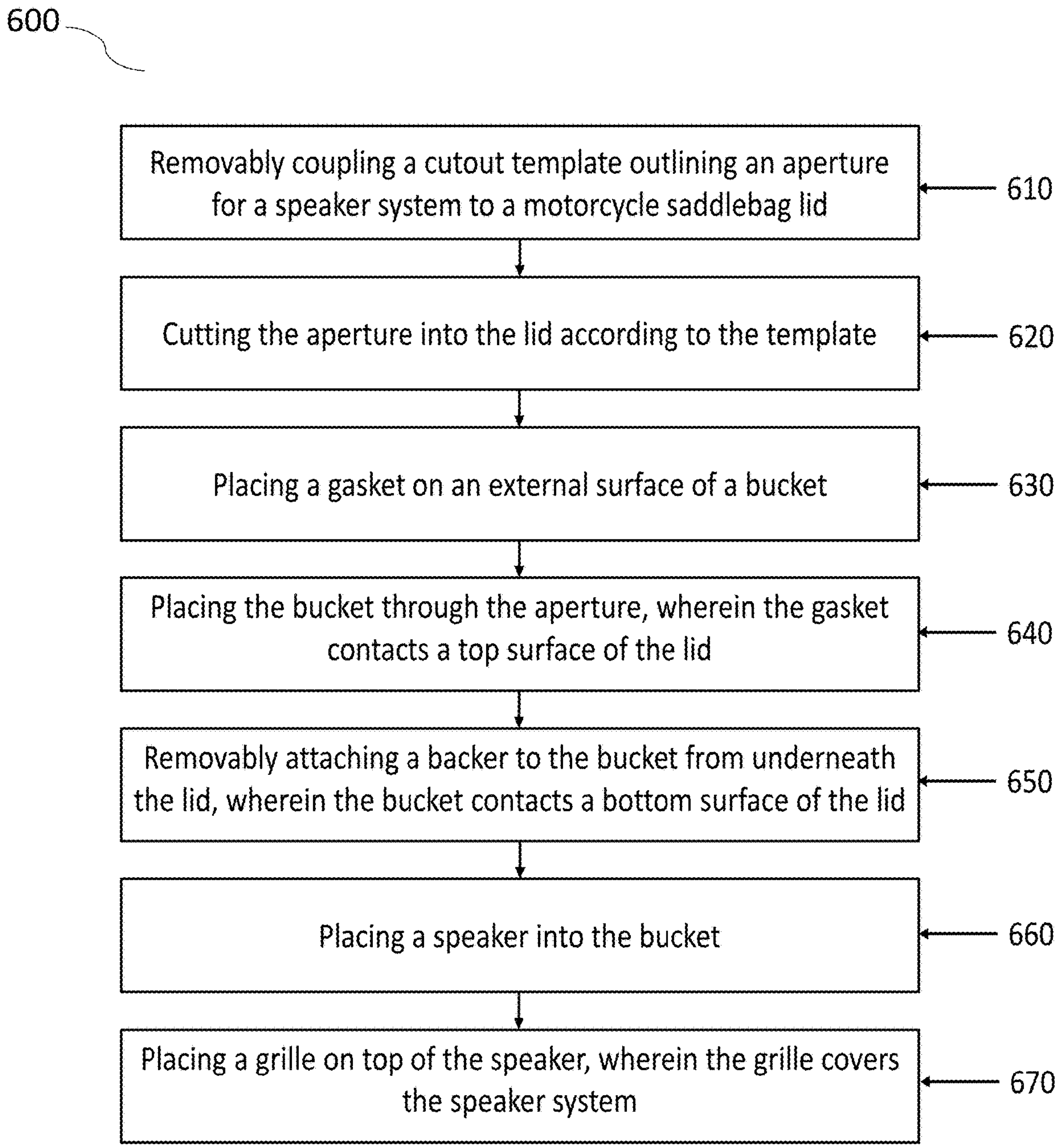
FIG. 6 is a flow chart of an example method of retrofitting a lid of a motorcycle saddlebag to receive a lid speaker, in accordance with various embodiments of this disclosure.
Figure 7:
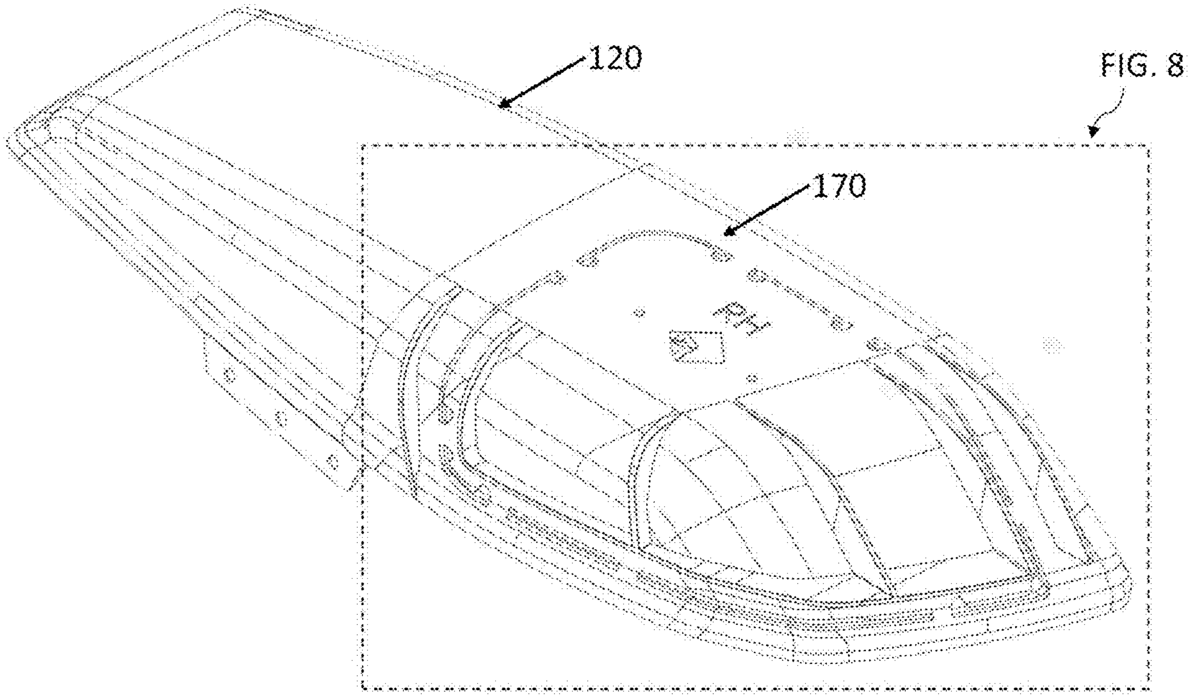
FIG. 7 is a top view of a saddlebag lid and cutout template according to various embodiments of this disclosure.
Figure 8:
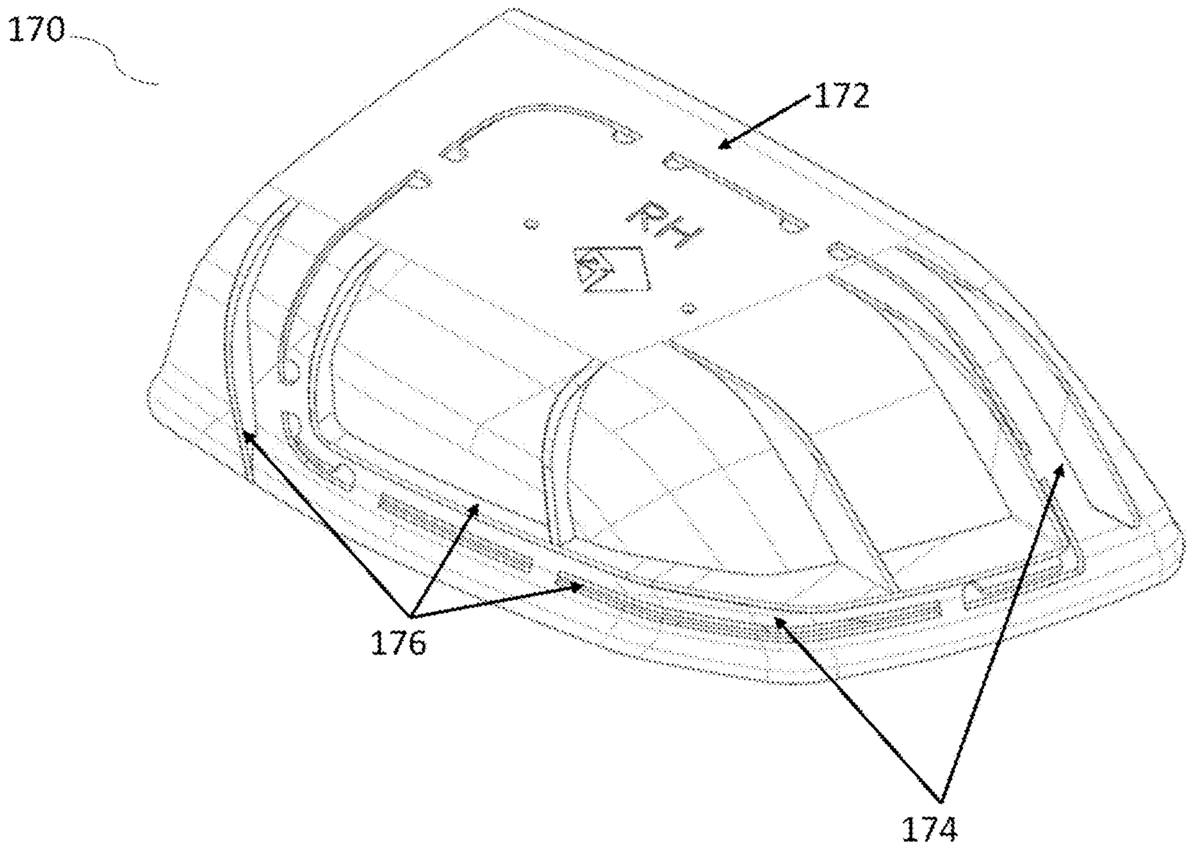
FIG. 8 is a perspective view of a cutout template according to various embodiments of this disclosure.

Turning now to FIG. 6, in accordance with various example embodiments, a method 600 for installing a lid mounted speaker in a motorcycle saddlebag is disclosed. The lid mounted speaker may be part of a speaker system, such as speaker system 100. The method 600 comprises removably coupling a speaker system cutout template, such as cutout template 170 shown in FIGS. 7 and 8, on the top surface of a saddlebag lid (step 610). In various embodiments, the cutout template 170 may be coupled to the saddle bag lid using any sufficient coupling device, such as tape, adhesive, screws, or bolts. In various embodiments, the cutout template 170 is a stencil designed to indicate where a plurality of openings are to be cut into the lid to produce an aperture, such as aperture 126, for the speaker system.

The method further comprises cutting an aperture for the speaker system into the lid according to the speaker template 170 (step 620). In an example embodiment, the aperture is cut or otherwise perforated into the lid with any instrument suitable for cutting through the template material, such as, for example, a knife, Sawzall, drill, hole saw, pneumatic body saw, jig saw, and/or the like. In an example embodiment, the aperture is cut directly through the template to ensure precise placement and dimensions.

In an example embodiment, the cutout template 170 may comprise a conformal shell 172. In an example embodiment, the conformal shell 172 may comprise a thin cover having first side configured to generally conform to the surface of a saddlebag lid and having a second side opposite the first side. The cover may, for example, be nominally ⅛th inch thick, though any suitable thickness may be used. In an example embodiment, the first side has a shape conformal to the portion of the motorcycle saddlebag lid to which it will be coupled. In various embodiments, the template 170 is configured to be placed over a portion of the motorcycle saddlebag lid.

In an example embodiment, the conformal shell comprises a plurality of saw cuts 174. In one example embodiment, the plurality of saw cuts 174 are thin elongated holes through the conformal shell. In various embodiments, the plurality of saw cuts 174 are configured to guide the cutting instrument to make the desired cuts in the lid of the saddlebag. In various embodiments, the plurality of saw cuts 174 may be ⅛th inch in width, though any suitable width may be used. However, in another example embodiment, the plurality of saw cuts 174 are visible indicators of where a cutting instrument should make the desired cuts, but do not comprise a hole passing through first side to the second side. To state it another way, the plurality of saw cuts 174 are merely shallow outlines of the suggested cuts a user should make to perforate the saddlebag lid.

Moreover, in an example embodiment, each saw cut in the plurality of saw cuts 174 comprises at least one drill hole. In various embodiments, drill holes are located at one or both ends of each saw cut in the plurality of saw cuts 174. The drill holes may be ¼" in diameter, or any suitable diameter that facilitates drilling a cutting hole in a desired location in the lid, inserting a cutting instrument through the cutting hole, and beginning to cut along each saw cut in the plurality of saw cuts 174. In an example embodiment the plurality of saw cuts 174 are configured to guide the cutting instrument to cut out a portion of the lid of the motorcycle saddlebag to create the aperture. In various embodiments, each saw cut in the plurality of saw cuts 174 may accommodate a cutting instrument such as, for example, a knife, Sawzall, drill, hole saw, pneumatic body saw, jig saw, or any instrument suitable for cutting through the template 170 material and/or lid of the saddlebag with precision to ensure precise placement and dimensions for installation of the speaker in the saddlebag lid.

In an example embodiment, the conformal shell 172 further comprises a guide rail 176 on the second side of the conformal shell. In various embodiments, the guide rail 176 comprises a plurality of guide rails. In an example embodiment, the guide rails 176 are configured to prevent a user from cutting the aperture at an angle that could damage the internal components of the saddlebag. For example, should a user attempt to cut into the template 170 at too sharp of an angle, the guide rail 176 will block the user from completing the movement, keeping the cutting instrument in line with the correct angle for perforation. In various embodiments, the plurality of guide rails 176 are configured to restrict angular movement of the cutting instrument and keep the cutting instrument perpendicular to the cutting surface.

In an example embodiment a pair of guide rails 176 may be located on either side of a saw cut in the plurality of saw cuts 174 in certain locations, such that the cutting instrument can ride on the top of the pair of rails in the plurality of guide rails 176 or be guided within the pair of rails in the plurality of guide rails 176. In another example embodiment, the plurality of rail in the plurality of guide rails 176 may provide structural rigidity to the conformal shell 172. In another example embodiment, the plurality of guide rails 176 are configured to prevent a user from cutting too deeply and potentially damaging components within the saddlebag. In this example embodiment, the plurality of guide rails 176 cause the cutting instrument to stand-off from the second side an amount suitable to protect components within the saddlebag. For example, should a user attempt to cut into the template at too sharp of an angle, the guide rail 176 will block the user from completing the movement, keeping the cutting instrument in line with the correct angle for perforation. In various embodiments, guide rail 176 is configured to restrict angular movement of the cutting instrument and keep the cutting instrument perpendicular to the cutting surface.

In an example embodiment, the speaker cut out template 170 is configured to be attached to the saddlebag. In an example embodiment, the template 170 is configured to facilitate coupling to the saddlebag by being attached with one or more screws or bolts. In this example embodiment, the template 170 may further comprise a hole or indentation, wherein the hole or indentation is located to inform a user where best to sink the screw or put the bolt to couple the template to the saddle bag. The hole or indentation may be configured to ensure that the screws and/or bolts be located in the portion of the saddlebag lid that is to be removed and discarded after the saw cut. Moreover, the hole or indentation may be configured to help a user avoid damaging components inside the saddlebag with errant screws or drilling.

In other example embodiments, the template 170 is coupled to the saddlebag via tape or adhesive, wherein the tape or adhesive is located on the first side of the template that is proximate the saddlebag lid. The tape or adhesive may be located on the portion of the template 170 that is interior of the saw cuts, so as to be connected to the portion of the saddlebag lid that will be removed and discarded after the cutting. In another example embodiment, the template may comprise visual indicators to inform the user whether the template is suitable for a lefthand saddlebag or a right hand saddle bag. For example, the template may comprise a LH or RH marking.

After completing step 620, any remaining template is then removed from the lid before the installation of any system components. In other embodiments, the design from the stencil may be traced onto the lid or otherwise demarcated by reference points and removed before the aperture is cut. In various embodiments in order to protect the portions of the lid that surround the aperture during the cutting, a protective skin may be placed on the lid before the step of coupling the template. In such embodiments, the template is placed directly over the protective skin. In various embodiments, the skin may be tape.

In an example embodiment, the method further comprises placing a gasket, such as gasket 140, on external surface of a bucket, such as bucket 130 (step 630). In an example embodiment, the gasket is a single continuous component providing an uninterrupted barrier around the perimeter of the bucket/lid interface. In other example embodiments, the gasket is formed by two or more gasket portions combining to create an appropriate environmental seal at the bucket/lid interface. In alternative embodiments, the method may comprise placing the gasket on the top surface of the saddlebag lid or on the external surface of the backer.

In an example embodiment, the method further comprises placing the bucket through the aperture (step 640). In this step, the bucket may contact the top surface of the lid. The contact between the bucket and lid may largely be via the gasket. In an example embodiment, and as further described below, the bucket is not screwed or otherwise coupled directly to the lid, however, the disclosure is not limited to this embodiment, and the bucket may be screwed or otherwise coupled directly to the lid. In various embodiments, the bucket is self-aligned to the aperture through a plurality of integrated alignment features, such as, for example, by replicating the shape and orientation of the aperture, ensuring it is installed in the correct orientation, minimizing the risk for user error.

In an example embodiment, the method further comprises attaching a backer, such as backer 110, to the bucket from the underside of the lid (Step 650). In this manner, the lid is sandwiched, at the interface, between the bucket and the backer. In an example embodiment, the bucket nests firmly within the backer, the external surface of the bucket contacting the internal surface of the backer. The bucket and the backer are coupled together using any suitable coupling device, such as, for example, bolts, screws or clasps.

In an example embodiment, a speaker, such as speaker 150, is placed within the bucket and coupled to the speaker system (Step 660). In another example embodiment, a speaker may be installed in the bucket 130. The speaker may be installed in the bucket after the bucket is connected to the backer. However, in another example embodiment, the speaker may be installed in the bucket prior to the bucket being set in the aperture and attached to the backer. In either embodiment, the speaker is installed from above the lid, being dropped into the aperture, as opposed to being installed from underneath the lid.

Finally, in accordance with various example embodiments, a grille, such as grille 160, is coupled to the speaker system (step 670), covering said system. In various embodiments, the grille 160 is coupled to the speaker system with a plurality of coupling devices.

The instant disclosure improves traditional aftermarket speaker system installation kits by sealing the saddlebag to the system on the top surface of the saddlebag lid. Further, the flange of the bucket is uniquely designed to follow the orientation of the lid walls, having a substantially L-shaped flat portion that aligns with the horizontal walls, and a substantially C or E-shaped portion that creates a channel and aligns with the vertical walls. Both of these features improve the watertight sealing capabilities of the speaker system, minimizing dust and water infiltration into the saddlebag. Further, the flexibility of the backer to contact the lid at only specific contact points instead of requiring a contact across the entire perimeter of the backer allows for the use of this speaker system with larger speakers than is possible with standard aftermarket kits.

In accordance with a different example embodiment, not shown, the bucket and backer are combined and inserted from below the lid, a speaker is installed from above the lid through the aperture, and the grille comprises a perimeter with a gasket attached to the underside of the grille for sealing against the lid of the saddlebag. In this example embodiment, the grille is attached to the bucket/backer such that the lid is secured between them.

In the present disclosure, the following terminology is used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes, and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including, for example, tolerances, measurement error, measurement accuracy limitations and other factors known to those of skill in the art, may occur in amounts that do not preclude the effect the characteristic was intended to provide. Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in the numerical range are individual values such as 2, 3 and 4 and sub-ranges such as 1-3, 2-4 and 3-5, etc. The same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

It should be appreciated that the particular implementations shown and described herein are illustrative of the example embodiments and their best mode and are not intended to otherwise limit the scope of the present disclosure in any way. Furthermore, the connecting lines shown in the various figures contained herein are intended to represent exemplary functional relationships and/or physical couplings between the various elements. It should be noted that many alternative or additional functional relationships or physical connections may be present in a practical device.

As one skilled in the art will appreciate, the mechanism of the present disclosure may be suitably configured in any of several ways. It should be understood that the mechanism described herein with reference to the figures is but one exemplary embodiment of the disclosure and is not intended to limit the scope of the disclosure as described above.

It should be understood, however, that the detailed description and specific examples, while indicating exemplary embodiments of the present disclosure, are given for purposes of illustration only and not of limitation. Many changes and modifications within the scope of the instant disclosure may be made without departing from the spirit thereof, and the disclosure includes all such modifications. The corresponding structures, materials, acts, and equivalents of all elements in the claims below are intended to include any structure, material, or acts for performing the functions in combination with other claimed elements as specifically claimed. The scope of the disclosure should be determined by the appended claims and their legal equivalents, rather than by the examples given above. For example, the operations recited in any method claims may be executed in any order and are not limited to the order presented in the claims. Moreover, no element is essential to the practice of the disclosure unless specifically described herein as "critical" or "essential."

What is claimed:

1. A method of installing a speaker system in a saddlebag of a motorcycle comprising:

coupling a cutout template to a top surface of a lid of the saddlebag;

perforating the lid according to the cutout template to create an aperture for the speaker system, wherein the aperture comprises a perimeter;

passing a bucket through the aperture, wherein the bucket is configured to contact the top surface of the lid;

coupling a backer to the bucket, and wherein the backer is configured to contact a bottom surface of the lid; and removably coupling a grille to the speaker system, wherein the grille is configured to cover the speaker system.

2. The method of claim 1, wherein the backer comprises a plurality of contact features positioned along a perimeter of a top surface of the backer, each contact feature in the plurality of contact features configured to contact the bottom surface of the lid.

3. The method of claim 1, wherein the grille is removably coupled to either the bucket or the top surface of the lid.

4. The method of claim 1, wherein the backer comprises a plurality of backer pieces, each backer piece in the plurality of backer pieces configured to contact the bottom surface of the lid.

5. The method of claim 1, further comprising placing a gasket around the perimeter of the aperture, wherein the gasket is configured to seal the saddlebag and prevent external material from entering the saddlebag through the aperture.

6. The method of claim 1, wherein the bucket contacts the top surface of the lid via a gasket, and wherein the gasket is configured to seal the saddlebag and prevent external material from entering the saddlebag through the aperture.

7. The method of claim 1, further comprising coupling a speaker to the bucket after the coupling of the backer to the bucket.

8. The method of claim 1, wherein the bucket further comprises a flange and wherein the flange comprises a first portion that is substantially L shaped configured to align with a horizontal wall of the lid and a second portion that is substantially E shaped configured to align with a vertical wall of the lid.

9. The method of claim 1, wherein the bucket further comprises a flange and wherein the flange comprises a first portion that is substantially L shaped configured to align with a horizontal wall of the lid and a second portion that is substantially C shaped configured to align with a vertical wall of the lid.

10. The method of claim 1, wherein perforating the lid comprises cutting into the lid with a cutting instrument, and wherein the cutout template comprises a guide rail configured to restrict angular movement of the cutting instrument during the perforating.

11. A speaker system comprising:

a bucket configured to pass through an aperture in a lid of a motorcycle saddlebag and contact a top surface of the lid, wherein the aperture comprises a perimeter;

a backer configured to couple to the bucket and contact a bottom surface of the lid; and a speaker configured to fit within the bucket and couple to the speaker system.

12. The speaker system of claim 11, wherein the backer comprises a plurality of contact features positioned along a perimeter of a top surface of the backer, each contact feature in the plurality of contact features configured to contact the bottom surface of the lid.

13. The speaker system of claim 12, wherein the plurality of contact features comprises at least three contact points.

14. The speaker system of claim 11, wherein the backer comprises a plurality of backer pieces, each backer piece in the plurality of backer pieces configured to contact the bottom surface of the lid.

15. The speaker system of claim 11, further comprising a grille configured to cover the speaker system and removably couple to the speaker system.

16. The speaker system of claim 11, wherein the bucket further comprises a flange.

17. The speaker system of claim 16, wherein the flange comprises a first portion that is substantially L shaped configured to align with a horizontal wall of the lid and a second portion that is substantially E shaped configured to align with a vertical wall of the lid.

18. The speaker system of claim 16, wherein the flange comprises a first portion that is substantially L shaped horizontal wall of the lid and a second portion that is substantially C shaped configured to align with a vertical wall of the lid.

19. The speaker system of claim 11, further comprising a gasket configured to be positioned around the perimeter of the aperture and create a seal to prevent external material from entering the motorcycle saddlebag through the aperture.

20. The speaker system of claim 11, wherein the backer and the bucket are configured to nest together.

* * * * *